US011793099B2

(12) United States Patent
Kraus

(10) Patent No.: US 11,793,099 B2
(45) Date of Patent: Oct. 24, 2023

(54) HARVESTER IMPLEMENT STEERING CONTROL SYSTEM TO PREVENT OVER-RUNNING HARVESTER HEAD END DURING TURN

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 505 days.

(21) Appl. No.: 17/094,032

(22) Filed: Nov. 10, 2020

(65) Prior Publication Data
US 2022/0142034 A1 May 12, 2022

(51) Int. Cl.
*A01B 69/04* (2006.01)
*A01D 41/06* (2006.01)
*A01D 41/127* (2006.01)

(52) U.S. Cl.
CPC ............ *A01B 69/008* (2013.01); *A01D 41/06* (2013.01); *A01D 41/1278* (2013.01)

(58) Field of Classification Search
CPC ... A01B 69/008; A01D 41/06; A01D 41/1278
See application file for complete search history.

(56) References Cited

U.S. PATENT DOCUMENTS

| | | | |
|---|---|---|---|
| 6,209,656 B1 * | 4/2001 | Gengler | A01B 69/006 701/5 |
| 6,336,051 B1 * | 1/2002 | Pangels | A01B 79/005 700/207 |
| 10,627,824 B2 * | 4/2020 | Runde | G05D 1/0274 |
| 11,612,102 B2 * | 3/2023 | Münch | A01D 41/1274 701/50 |
| 2012/0067037 A1 * | 3/2012 | Bohrer | A01D 75/187 60/450 |
| 2012/0096824 A1 * | 4/2012 | Burger | A01D 69/00 56/119 |
| 2014/0215983 A1 * | 8/2014 | Pollklas | A01D 45/00 56/10.2 R |
| 2014/0311113 A1 * | 10/2014 | Bonefas | A01D 75/02 56/10.2 R |
| 2016/0031443 A1 * | 2/2016 | Komatsu | B60W 30/143 701/93 |
| 2016/0281328 A1 * | 9/2016 | Hino | B62D 55/06 |
| 2017/0311534 A1 * | 11/2017 | Rusciolelli | A01B 79/005 |

(Continued)

*Primary Examiner* — Mussa A Shaawat

(57) ABSTRACT

A harvester implement includes a traction unit and a harvester head having a first lateral edge and a second lateral edge. A controller determines a first ground speed of the first lateral edge and a second ground speed of the second lateral edge. The controller may then determine if either the first ground speed or the second ground speed is greater than a maximum allowable harvest speed, such as may occur when executing a turn. When one of the first ground speed or the second ground speed of the harvester head is greater than the maximum allowable harvest speed, the controller may then control a drive system of the traction unit to decrease the ground speed from an initial traction unit ground speed to a reduced traction unit ground speed so that both the first and second lateral edges of the harvester head stay below the maximum allowable harvest speed.

19 Claims, 3 Drawing Sheets

(56) References Cited

U.S. PATENT DOCUMENTS

| | | | | |
|---|---|---|---|---|
| 2018/0141436 A1* | 5/2018 | Muench | ............ | B60K 31/00 |
| 2019/0002023 A1* | 1/2019 | Fay, II | ............ | B62D 11/04 |
| 2020/0352100 A1* | 11/2020 | Münch | ............ | A01D 69/005 |
| 2021/0139074 A1* | 5/2021 | Fay, II | ............ | B62D 15/029 |
| 2021/0153435 A1* | 5/2021 | Martin | ............ | A01D 57/02 |
| 2021/0212248 A1* | 7/2021 | Kong | ............ | A01D 41/144 |
| 2021/0307248 A1* | 10/2021 | Missotten | ............ | A01D 57/12 |

* cited by examiner

HARVESTER IMPLEMENT STEERING CONTROL SYSTEM TO PREVENT OVER-RUNNING HARVESTER HEAD END DURING TURN

TECHNICAL FIELD

The disclosure generally relates to a harvester implement and a method of controlling the harvester implement.

BACKGROUND

Many harvester implements include a traction unit with a harvester head attached to the traction unit. Examples of such harvester implements may include, but are not limited to, a self-propelled windrower, a combine, a self-propelled forage harvester, etc. The harvester head may extend transverse or generally perpendicular to a direction of travel of the traction unit and may span a head width perpendicular to the traction unit. In some implementations, the head width may be up to or even greater than fifty feet (50′).

The harvester head may have a maximum allowable harvest speed, which is the maximum ground speed that the harvester may harvest crop material from a field without malfunction or plugging. The maximum allowable harvest speed may vary depending upon the type of crop material, the crop yield, the type of harvester head, etc.

When the harvester implement travels in a straight, forward direction, both ends of the harvester head travel at the same ground speed as the traction unit. However, when turning, due to the large head width of the harvester head, the radial inward end of the harvester head slows down or exhibits a negative or backward velocity, whereas the radial outward end of the harvester head is accelerated to an increased velocity through the turn. Because the radial outward end of the harvester head is accelerated during the turn, the ground speed of the radial outward end of the harvester head may exceed the maximum allowable harvest speed.

SUMMARY

A harvester implement is provided. The harvester implement includes a traction unit and a harvester head. The traction unit extends along a central longitudinal axis of the traction unit, between a forward end and a rearward end relative to a direction of forward travel. The traction unit includes a drive system that is operable to move the traction unit. The harvester head is attached to the traction unit. The harvester head spans a head width perpendicular to the central longitudinal axis, between a first lateral edge and a second lateral edge of the harvester head. A controller includes a processor and a memory having a speed control algorithm stored thereon. The processor is operable to execute the speed control algorithm to receive, via a user input, a maximum allowable harvest speed. The controller may then determine a first ground speed of the first lateral edge of the harvester head, and determine a second ground speed of the second lateral edge of the harvester head. The controller may then determine if either the first ground speed or the second ground speed is greater than the maximum allowable harvest speed. When one of the first ground speed or the second ground speed of the harvester head is greater than the maximum allowable harvest speed, the controller may then control the drive system to decrease the ground speed from an initial traction unit ground speed to a reduced traction unit ground speed.

In one aspect of the disclosure, the processor is operable to execute the speed control algorithm to calculate the reduced traction unit ground speed. The reduced traction unit ground speed is calculated to equal a speed of the traction unit that limits both the first ground speed and the second ground speed of the harvester head to respective values that are equal to or less than the maximum allowable harvest speed.

In one aspect of the disclosure, the harvester implement includes at least one sensor that is in communication with the controller. The sensor is operable to sense data related to the first ground speed and the second ground speed of the harvester implement. In one implementation, the at least one sensor may include a first head speed sensor and a second head speed sensor. The first head speed sensor may be positioned proximate the first lateral edge of the harvester head and operable to sense data related to the first ground speed of the harvester head. The second head speed sensor may be positioned proximate the second lateral edge of the harvester head and operable to sense data related to the second ground speed of the harvester head.

In another implementation, the at least one sensor may be operable to sense data related to a steering angle of the traction unit. The processor is operable to execute the speed control algorithm to calculate a steering angle of the traction unit from the data sensed from the sensor related to the steering angle of the traction unit. In one implementation, the at least one sensor may include a steering angle sensor coupled to a steering input.

In another implementation, the drive system may include a first drive wheel and a second drive wheel disposed opposite the central longitudinal axis from the first drive wheel. The at least one sensor may include a first wheel speed sensor and a second wheel speed sensor. The first wheel speed sensor may be operable to sense data related to a rotational speed of the first drive wheel. The second wheel speed sensor may be operable to sense data related to a rotational speed of the second drive wheel. The processor is operable to execute the speed control algorithm to calculate a steering angle of the traction unit from the data sensed from the first wheel speed sensor related to the rotational speed of the first drive wheel and the second wheel speed sensor related to the rotational speed of the second drive wheel.

In another implementation, the traction unit may include a first steerable wheel and a second steerable wheel disposed opposite the central longitudinal axis from the first steerable wheel. The at least one sensor may include a first steerable wheel angle sensor and a second steerable wheel angle sensor. The first steerable wheel angle sensor may be operable to sense data related to an angle of the first steerable wheel relative to the central longitudinal axis. The second steerable wheel angle sensor may be operable to sense data related to an angle of the second steerable wheel relative to the central longitudinal axis. The processor may be operable to execute the speed control algorithm to calculate a steering angle of the traction unit from the data sensed from the first steerable wheel angle sensor related to the angle of the first steerable wheel relative to the central longitudinal axis, and the second steerable wheel angle sensor related to the angle of the second steerable wheel relative to the central longitudinal axis.

In one aspect of the disclosure, processor may be operable to execute the speed control algorithm to calculate a radius of curvature of a travel path of the traction unit and an angular velocity of the traction unit on the travel path. The controller may then calculate the first ground speed and the second ground speed of the harvester head from the radius of curvature of the travel path of the traction unit and the angular velocity of the traction unit on the travel path. The controller may calculate the radius of curvature of the travel path and/or the angular velocity from the dimensions of the harvester head and the traction unit, the steering angle and the velocity of the traction unit.

A method of controlling a harvester implement is also provided. The harvester implement includes a traction unit and a harvester head attached to the traction unit. The harvester head extends perpendicular to a direction of travel of the traction unit. The method includes defining a maximum allowable harvest speed, and then controlling a drive system of the traction unit to move the traction unit at an initial traction unit ground speed. A controller may determine a first ground speed of a first lateral edge of the harvester head with a controller and determine a second ground speed of a second lateral edge of the harvester head. The controller may then determine if either the first ground speed or the second ground speed is greater than the maximum allowable harvest speed. When both of the first ground speed and the second ground speed of the harvester head are equal to or less than the maximum allowable harvest speed, then the controller may continue to control the drive system of the traction unit to move the traction unit at the initial traction unit ground speed. When one of the first ground speed or the second ground speed of the harvester head is greater than the maximum allowable harvest speed, the controller may then control the drive system of the traction unit to decrease the initial traction unit ground speed to a reduced traction unit ground speed.

In one aspect of the disclosure, the method includes calculating the reduced traction unit ground speed. The controller calculates the reduced traction unit ground speed to equal a speed of the traction unit that limits both the first ground speed and the second ground speed of the harvester head to respective values that are equal to or less than the maximum allowable harvest speed.

In one aspect of the disclosure, the method may include sensing data related to the first ground speed and the second ground speed of the harvester implement with at least one sensor in communication with the controller.

In one aspect of the disclosure, the method may include the controller calculating a radius of curvature of a travel path of the traction unit and calculating an angular velocity of the traction unit on the travel path with the controller, using the data sensed from the at least one sensor. The controller may then calculate the first ground speed and the second ground speed of the harvester head from the radius of curvature of the travel path of the traction unit and the angular velocity of the traction unit on the travel path.

Accordingly, the harvester implement and the method described herein automatically slow the harvester implement when one of the first lateral edge or the second lateral edge of the harvester head is moving faster than the maximum allowable harvest speed. For example, during a turn maneuver of the traction unit, when a radial outward end of the harvester head is accelerated to a speed that is greater than the maximum allowable harvest speed, the controller may reduce the travel speed of the traction unit to the reduced traction unit ground speed to slow the radial outward end of the harvester head to the maximum allowable harvest speed, thereby preventing the harvester head from plugging and otherwise malfunctioning due to excessive speed during the turn maneuver.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
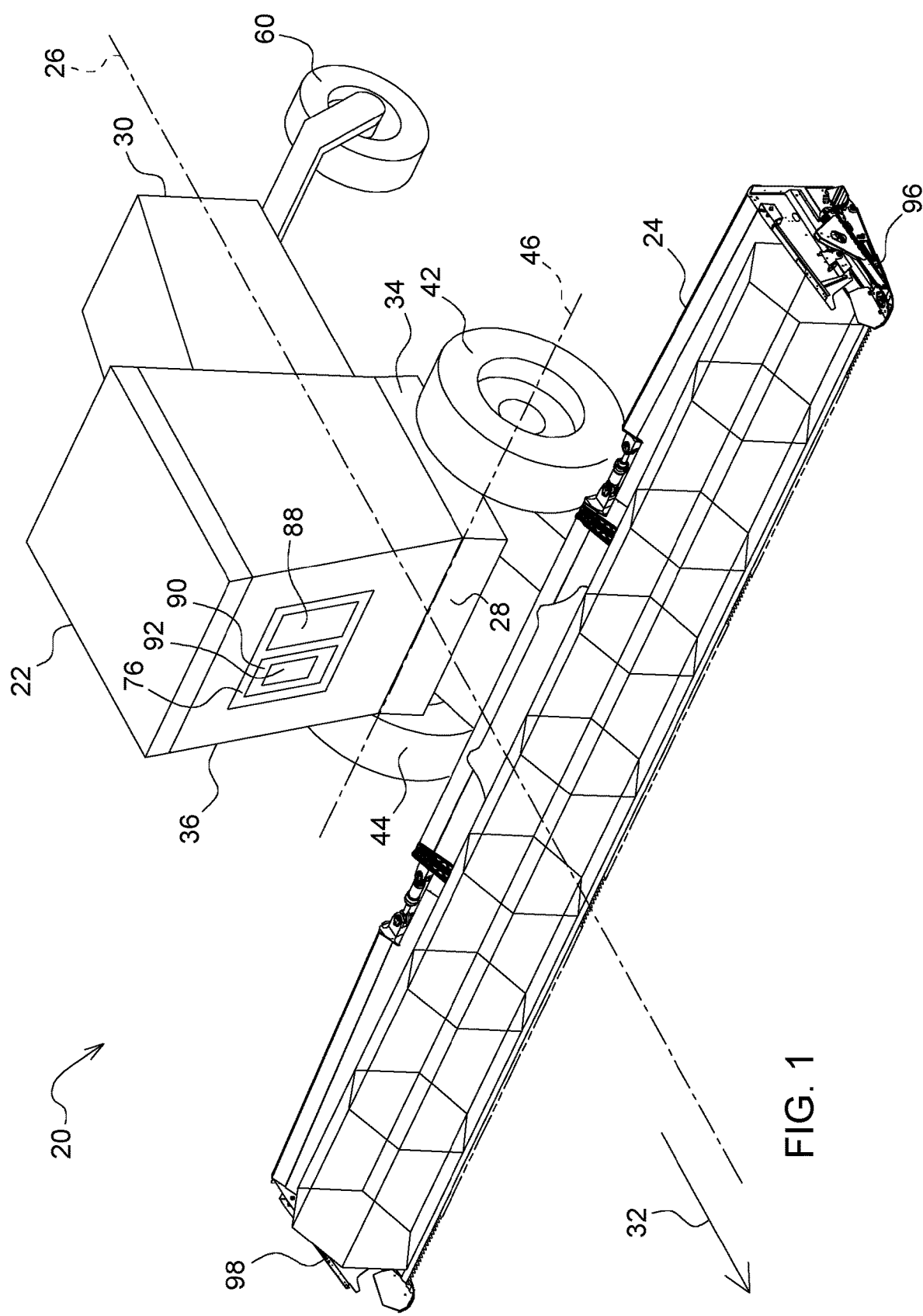
FIG. 1 is a schematic perspective view of a harvester implement.

Referring to the Figures, wherein like numerals indicate like parts throughout the several views, a harvester implement is generally shown at 20. Referring to FIG. 1, the example implementation of the harvester implement 20 shown in the Figures and described herein is configured as a self-propelled windrower. However, it should be appreciated that the teachings of this disclosure may be applied to machines other than the example self-propelled windrower shown and depicted herein. For example, the harvester implement 20 may alternatively be configured as a combine, a self-propelled forage harvester, a tractor, etc.

Figure 2:
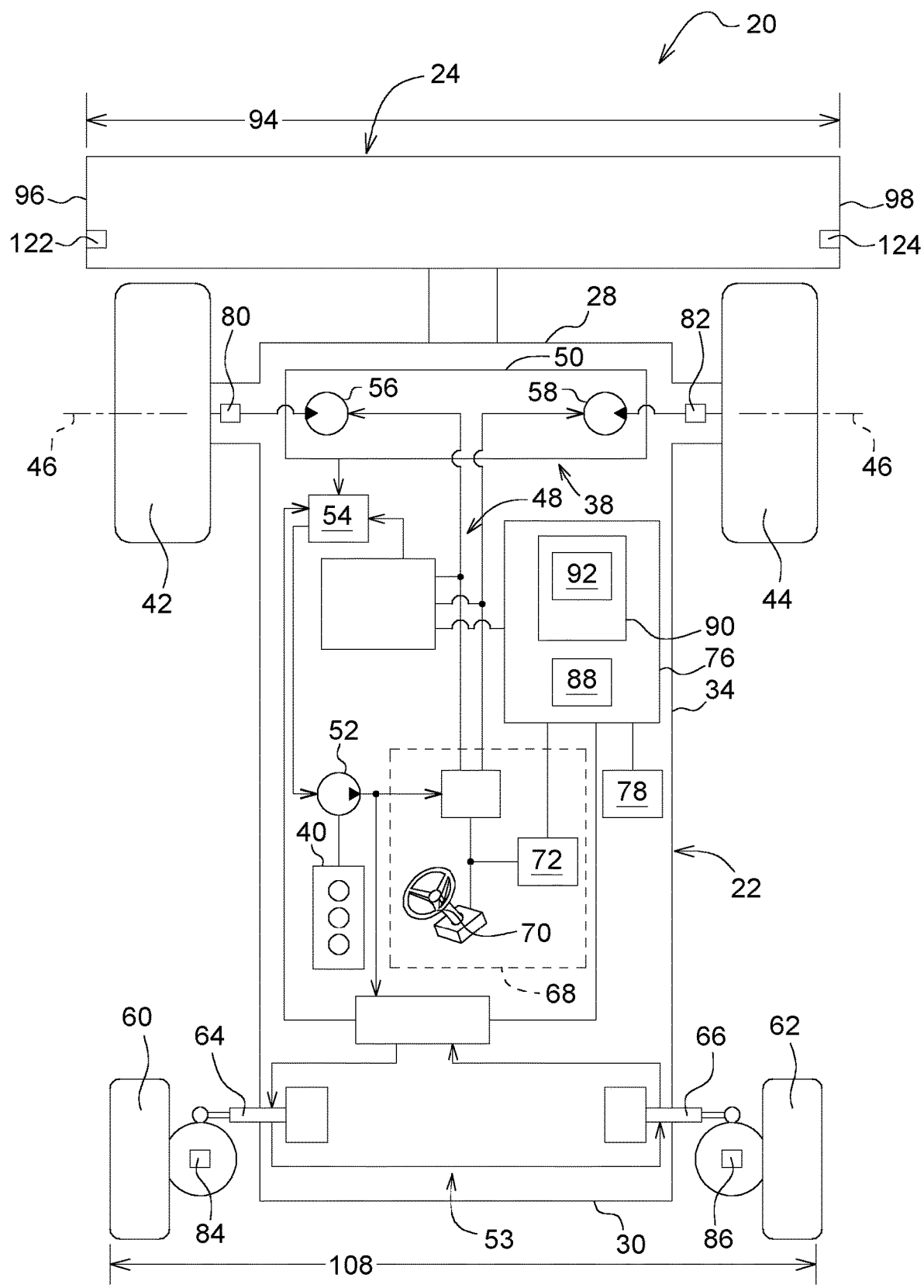
FIG. 2 is a schematic plan view of the harvester implement.

The harvester implement 20 includes a traction unit 22 and a harvester head 24. Referring also to FIG. 2, The traction unit 22 extends along a central longitudinal axis 26 between a forward end 28 and a rearward end 30, relative to a direction of forward travel 32. In the example implementation shown in the Figures and described herein, the harvester head 24 is attached proximate the forward end 28 of the traction unit 22. However, it should be appreciated that in other implementations, the harvester head 24 may be attached to the rearward end 30 of the traction unit 22.

Referring to FIG. 1, the traction unit 22 includes a frame 34, on which is supported a cab 36. The cab 36 includes an operator's station, from which an operator may control the harvester implement 20. The cab 36 includes the various controls, displays, input devices, etc., necessary for the operator to control the harvester implement 20.

Referring to FIG. 2, the traction unit 22 includes a drive system 38 operable to move the traction unit 22. The drive system 38 includes a prime mover 40 that is supported by the frame 34. The prime mover 40 may include, but is not limited to, an internal combustion engine, an electric motor, a combination of both, or some other device capable of generating torque to power the traction unit 22 and the harvester head 24. In the example implementation shown in the Figures and described herein, the drive system 38 includes a first drive wheel 42 and a second drive wheel 44 that are each mounted to the frame 34, adjacent the forward end 28 of the frame 34. The first drive wheel 42 and the second drive wheel 44 are disposed opposite each other across the central longitudinal axis 26 from each other. The first drive wheel 42 and the second drive wheel 44 are rotatable about a transverse axis 46. The transverse axis 46 is arranged perpendicular to the central longitudinal axis 26 of the frame 34. The first drive wheel 42 and the second drive wheel 44 are fixed in a forward-facing orientation, such that the first drive wheel 42 and the second drive wheel 44 do not pivot about a respective vertical axis.

As shown in FIG. 2., in the example implementation of the traction unit 22 described herein, the traction unit 22 includes a hydraulic fluid system 48, and the drive system 38 includes a front differential hydraulic drive system 50. The hydraulic fluid system 48 provides a flow of a hydraulic fluid to the front differential hydraulic drive system 50 for rotating the first drive wheel 42 and the second drive wheel 44. The front differential hydraulic drive system 50 is operable to drive the first drive wheel 42 at a first rotational speed, and the second drive wheel 44 at a second rotational speed.

The hydraulic fluid system 48 includes a pump 52. The pump 52 is operable to circulate the hydraulic fluid. The pump 52 may be connected to and driven by prime mover 40. The pump 52 may include a single pump, or multiple pumps. While the detailed description refers to the pump 52 singularly, and FIG. 2 shows only a single pump 52, it should be appreciated that the pump 52 may include more than one pump. For example, the pump 52 may include a first pump for driving the first drive wheel 42, a second pump for driving the second drive wheel 44, a third pump for a rear steering system 53, and a fourth pump for auxiliary components and/or systems, such as but not limited to the harvester head 24. It should be appreciated that the traction unit 22 may be equipped with other additional pumps for other systems and/or devices.

The hydraulic fluid system 48 further includes a tank 54. The hydraulic fluid system 48 interconnects the pump 52, the front differential hydraulic drive system 50, and the tank 54. The tank 54 is disposed in fluid communication with the hydraulic fluid system 48 and the pump 52. As such, it should be appreciated that the pump 52 draws hydraulic fluid from the tank 54, circulates the hydraulic fluid through the hydraulic fluid system 48, including the front differential hydraulic drive system 50, the rear steering system 53, potentially other systems of the traction unit 22, and back to the tank 54 to complete a fluid circuit. It should be appreciated that the various hydraulic components and/or hydraulic systems of the harvester implement 20 may be connected through lines and/or conduits that are not shown or depicted in the Figures, nor specifically described herein.

The pump 52 supplies pressurized fluid to a first hydraulic motor 56 and a second hydraulic motor 58. The first hydraulic motor 56 is coupled to the first drive wheel 42 and operable to rotate the first drive wheel 42 to propel the agricultural machine. The second hydraulic motor 58 is coupled to the second drive wheel 44 and is operable to rotate the second drive wheel 44 to propel the agricultural machine. As understood by those skilled in the art, the first drive wheel 42 and the second drive wheel 44 may be simultaneously rotated in the same rotational direction and at the same rotational speed about the transverse axis 46 to drive the traction unit 22 forward or rearward, depending upon the direction of rotation. Additionally, the first drive wheel 42 and the second drive wheel 44 may be rotated in the same rotational direction at different rotational speeds about the transverse axis 46, or in opposite rotational directions at the same or different rotational speeds about the transverse axis 46, in order to turn the traction unit 22.

The drive system 38 described above is merely an example implementation. It should be appreciated that the drive system 38 may differ from the example implementation of the front differential hydraulic drive system 50 described herein, and may include any system capable of moving the traction unit 22 relative to the ground surface.

Referring to FIG. 2, the example implementation of the traction unit 22 may further include a first steerable wheel 60 and a second steerable wheel 62. The first steerable wheel 60 and the second steerable wheel 62 are rotatably attached to the frame 34 proximate the rearward end 30 of the frame 34. The first steerable wheel 60 and the second steerable wheel 62 are rotatable about respective vertical axes. The first steerable wheel 60 and the right steerable wheel may be configured as caster wheels. As used herein, the term "caster wheel" should be understood to include a wheel that is able to rotate a full three hundred sixty degrees (360°) about a respective generally vertical axis. As such, each of the first steerable wheel 60 and the second steerable wheel 62 are rotatable a full three hundred sixty degrees (360°) about a respective generally vertical axis. The first steerable wheel 60 and the second steerable wheel 62 may be attached to the frame 34 in a suitable manner. For example, the first steerable wheel 60 and the second steerable wheel 62 may each be attached to the frame 34 via a respective arm. The arm includes an upper shaft that is rotatable about the generally vertical axis. The respective caster wheel is attached to a lower distal end of the arm. Typically, a generally horizontal axis of rotation of the respective caster wheel is longitudinally offset from the generally vertical axis, such that the caster wheel tends to follow behind the generally vertical axis. It should be appreciated that the first steerable wheel 60 and the second steerable wheel 62 may be attached to the frame 34 in some other manner than described herein.

A first side actuator 64 interconnects the first steerable wheel 60 and the frame 34, and is configured to control a position of the first steerable wheel 60. Similarly, a second side actuator 66 interconnects the second steerable wheel 62 and the frame 34, and is configured to control a position of the second steerable wheel 62. In the example embodiment shown in FIG. 2 and described herein, each of the first side actuator 64 and the second side actuator 66 include a double acting hydraulic cylinder. The first side actuator 64 and the second side actuator 66 may be controlled to extend and retract to control a position of the first steerable wheel 60 and the second steerable wheel 62, to provide a steering effect to the traction unit 22. It should be appreciated that the traction unit 22 may be configured differently than described herein, and may not include steerable rear wheels. For example, in other implementations, the traction unit 22 may include non-steerable caster wheels.

Referring to FIG. 2, the traction unit 22 includes a steering control system 68 that is operable to receive a steering command input from an operator. The steering control system 68 includes a steering input device 70. The operator uses the steering input device 70 to enter the steering command input. The steering input device 70 may include, but is not limited to, a steering wheel, steering levers, a joystick, a touch screen, etc.

The steering control system 68 may include a steering sensor 72 that is coupled to the steering input device 70. The steering sensor 72 is operable to sense data related to a steering angle 74 of the traction unit 22. The steering sensor 72 is operable to detect the steering command input of the steering input device 70, and output a sensor signal indicative of the steering command input to a controller 76. The steering sensor 72 may include any type and/or configuration of sensor suitable for detecting the steering command input from the steering input device 70, and may be dependent upon the specific type of steering input device 70 used. The specific type and/or manner of operation of the steering sensor 72 are not pertinent to the teachings of this disclosure, are well known in the art, and are therefore not described in detail herein.

The controller 76 is in communication with the steering sensor 72, and receives the sensor signal that indicates the steering command input from the steering input device 70. The controller 76 generates a front steering control signal and a rear steering control signal based on the sensor signal for the steering command input. The front steering control signal controls steering provided by the first drive wheel 42 and the second drive wheel 44. The rear steering control signal controls steering provided by first steerable wheel 60 and the second steerable wheel 62.

Referring to FIG. 2, the traction unit 22 may further include a traction unit speed sensor 78. The traction unit speed sensor 78 is operable to sense a speed of the traction unit 22 and communicate the sensed speed to the controller 76. The traction unit speed sensor 78 may include any type and/or configuration of sensor capable of sensing and/or determining a ground speed of the traction unit 22. The specific type and configuration of traction unit speed sensor 78 is not pertinent to the teachings of this disclosure, are known to those skilled in the art, and are therefore not described in detail herein.

The traction unit 22 may further include a first wheel speed sensor 80 and a second wheel speed sensor 82. The first wheel speed sensor 80 and the second wheel speed sensor 82 are operable to sense data related to the steering angle 74 of the traction unit 22. The first wheel speed sensor 80 is operable to sense data related to a rotational speed of the first drive wheel 42. The second wheel speed sensor 82 is operable to sense data related to a rotational speed of the second drive wheel 44. The controller 76 may use the data from the first wheel speed sensor 80 and the data from the second wheel speed sensor 82 to determine the steering angle 74 of the traction unit 22.

The traction unit 22 may further include a first steerable wheel angle sensor 84 and a second steerable wheel angle sensor 86 that are operable to sense data related to a steering angle 74 of the traction unit 22. The first steerable wheel angle sensor 84 is operable to sense data related to an angle of the first steerable wheel 60 relative to the central longitudinal axis 26. The second steerable wheel angle sensor 86 is operable to sense data related to an angle of the second steerable wheel 62 relative to the central longitudinal axis 26. The controller 76 may use the data from the first steerable wheel angle sensor 84 and the data from the second steerable wheel angle sensor 86 to determine the steering angle 74 of the traction unit 22.

The controller 76 is disposed in communication with the various sensors of the traction unit 22 and the harvester head 24, as well as the drive system 38. The controller 76 is operable to receive data from the sensors and control the drive system 38 as described in greater detail below. While the controller 76 is generally described herein as a singular device, it should be appreciated that the controller 76 may include multiple devices linked together to share and/or communicate information therebetween.

The controller 76 may alternatively be referred to as a steering controller, a computer, a computing device, a control unit, a control module, a module, etc. The controller 76 includes a processor 88, a memory 90, and all software, hardware, algorithms, connections, sensors, etc., necessary to manage and control the operation of the drive system 38. As such, a method may be embodied as a program or algorithm operable on the controller 76. It should be appreciated that the controller 76 may include any device capable of analyzing data from various sensors, comparing data, making decisions, and executing the required tasks.

As used herein, "controller" is intended to be used consistent with how the term is used by a person of skill in the art, and refers to a computing component with processing, memory, and communication capabilities, which is utilized to execute instructions (i.e., stored on the memory 90 or received via the communication capabilities) to control or communicate with one or more other components. In certain embodiments, the controller 76 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 76 may be in communication with other components on the harvester implement 20, such as hydraulic components, electrical components, and operator inputs, the steering input device 70, etc. within the cab 36 of the traction unit 22. The controller 76 may be electrically connected to these other components by a wiring harness such that messages, commands, and electrical power may be transmitted between the controller 76 and the other components. Although the controller 76 is referenced in the singular, in alternative embodiments the configuration and functionality described herein can be split across multiple devices using techniques known to a person of ordinary skill in the art.

The controller 76 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 90 may include any non-transitory/tangible medium which participates in providing data or computer-readable instructions. The memory 90 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller 76 includes the tangible, non-transitory memory 90 on which are recorded computer-executable instructions, including a speed control algorithm 92. The processor 88 of the controller 76 is configured for executing the speed control algorithm 92. The speed control algorithm 92 implements a method of controlling the harvester implement 20, described in detail below.

Referring to FIG. 2, the harvester head 24 spans a head width 94 perpendicular to the central longitudinal axis 26 of the frame 34. The harvester head 24 spans between a first lateral edge 96 and a second lateral edge 98. The configuration and operation of the harvester head 24 is dependent upon the type of crop material to be harvested. For example, referring to FIG. 1, the implementation shown and described herein includes the harvester head 24 configured as a draper style cutter head for cutting forage or other small stem crops. However, it should be appreciated that the harvester head 24 may be configured differently than the example implementation shown in the Figures and described herein, and that the scope of the claims is not limited to the example implementation.

The harvester head 24 moves with the traction unit 22. The first lateral edge 96 of the harvester head 24 moves at a first ground speed 100, and the second lateral edge 98 of the harvester head 24 moves at a second ground speed 102. When the traction unit 22 is moving in a substantially straight path, both the first lateral edge 96 and the second lateral edge 98 of the harvester head 24 move at the same relative ground speed 106 as the traction unit 22. As such, both the first ground speed 100 and the second ground speed 102 are equal to each other and to the ground speed 106 of the traction unit 22. However, if the head width 94 is different than a width 108 of the traction unit 22, when the traction unit 22 is executing a turn, a radially inner end of the harvester head 24 will move at a relatively slower ground speed or even a negative ground speed relative to the traction unit 22, whereas a radially outer end of the harvester head 24 will move at a faster ground speed relative to the traction unit 22. As such, when executing a turn, the first ground speed 100 is different than the second ground speed 102 and the ground speed of the traction unit 22.

Figure 3:
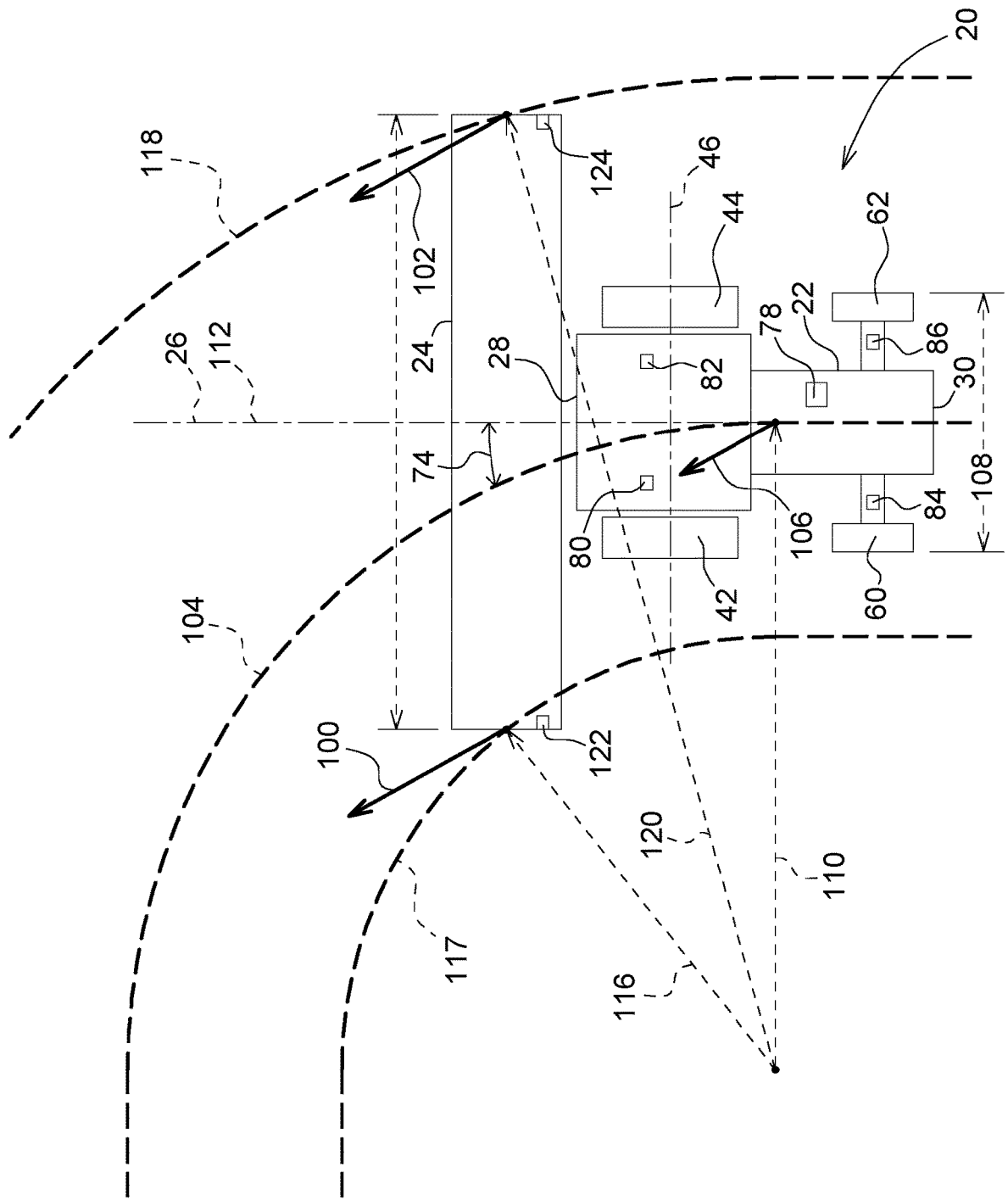
FIG. 3 is a schematic plan view of the harvester implement executing a turn to the left.

Referring to FIG. 3, the harvester implement 20 is shown executing a turn to the left. The traction unit 22 is shown moving along an arcuate travel path 104 having a primary radius 110. The harvester head 24 is generally perpendicular to a tangent 112 of the arcuate travel path 104 at any given moment. As such, the first lateral edge 96 is moving along an inner arcuate path 114 having a first radius 116, which is significantly less than the primary radius 110. For this reason, when executing the turn to the left, the first lateral edge 96 moves a lesser distance than the traction unit 22 and the second lateral edge 98, and thereover moves at a slower relative ground speed relative to the traction unit 22 and the second lateral edge 98. As such, the first ground speed 100 is less than the second ground speed 102. In contrast, the second lateral edge 98 is moving along an outer arcuate path 118 having a second radius 120, which is significantly greater than the primary radius 110 or the first radius 116. For this reason, when executing a turn to the left, the second lateral edge 98 moves a greater distance than the traction unit 22 or the first lateral edge 96, and therefore moves at a faster relative ground speed than the traction unit 22 and the first lateral edge 96. As such, the second ground speed 102 is greater than the first ground speed 100. It should be appreciated that the relative ground speeds described above are reversed for a turn to the right.

The traction unit 22 includes at least one sensor that is in communication with the controller 76 and operable to sense data related to the first ground speed 100 and the second ground speed 102 of the harvester implement 20. As shown in FIG. 2, the sensor(s) for sensing data related to the first ground speed 100 and the second ground speed 102 may include, but are not limited to, the steering sensor 72, the traction unit speed sensor 78, the first wheel speed sensor 80, the second wheel speed sensor 82, the first steerable wheel angle sensor 84, the second wheel angle sensor, or a combination of the above.

In one implementation, the at least one sensor for sensing data related to the first ground speed 100 of the first lateral edge 96 of the harvester head 24 and the second ground speed 102 of the second lateral edge 98 of the harvester head 24 includes a first head speed sensor 122 and a second head speed sensor 124. The first head speed sensor 122 is positioned proximate the first lateral edge 96 of the harvester head 24 and operable to sense data related to the first ground speed 100 of the harvester head 24. The second head speed sensor 124 is positioned proximate the second lateral edge 98 of the harvester head 24 and operable to sense data related to the second ground speed 102 of the harvester head 24. The first head speed sensor 122 and the second head speed sensor 124 may include any type of sensor capable of sensing relative ground speed, such as but not limited to a distance sensor, a GPS sensor, etc.

As described above, the processor 88 is operable to execute the speed control algorithm 92 to implement a method of controlling the harvester implement 20. The method includes defining a maximum allowable harvest speed. The maximum allowable harvest speed is a speed of the harvest head relative to the ground and is defined as an upper limit of proper operation. In other words, the operation of the harvester head 24 above the maximum allowable harvest speed may result in improper functioning and/or clogging or other malfunctions of the harvester head 24. The maximum allowable harvest speed is dependent upon the specific type, configuration, and operation of the harvester head 24, as well as the type of crop, crop yield, field conditions, etc. For example, the maximum allowable harvest speed for the example implementation of the draper style header shown in the figures may be defined approximately equal to five miles per hour (5 mph).

The controller 76 may receive the maximum allowable harvest speed via a user input. The user input may include, but is not limited to, a keyboard, a touchscreen display, a microphone, or some other data input device. Alternatively, the maximum allowable harvest speed may be associated with different makes and models of the equipment, and stored in a data file on the memory 90 of the controller 76. The operator or controller 76 may identify the harvester head 24, refer to the data file stored in the memory 90 of the controller 76 to receive the maximum allowable harvest speed.

The drive system 38 of the traction unit 22 may then be controlled to move the traction unit 22 at an initial traction unit 22 ground speed. The drive system 38 may be manually controlled by the operator. In other implementations, the drive system 38 is automatically controlled by the controller 76. The initial traction unit 22 ground speed may be any desired operating speed for the traction unit 22. However, in one implementation, the initial traction unit 22 ground speed may be defined to equal a ground speed of the traction unit 22 that is substantially equal to or slightly less than the maximum allowable harvest speed.

Data related to the first ground speed 100 and the second ground speed 102 of the harvester implement 20 is sensed with at least one sensor and communicated to the controller 76. As noted above, the at least one sensor used to sense the data related to the first ground speed 100 and the second ground speed 102 may include, but is not limited to, the first head speed sensor 122, the second head speed sensor 124, the steering sensor 72, the traction unit speed sensor 78, the first wheel speed sensor 80, the second wheel speed sensor 82, the first steerable wheel angle sensor 84, the second wheel angle sensor, or a combination of the above. It should be appreciated that some other type of sensor capable of sensing some other type of data may further be used to calculate or otherwise the determine the first ground speed 100 and the second ground speed 102.

The controller 76 uses the data from the at least one sensor related to the first ground speed 100 and the second ground speed 102 to calculate or otherwise determine the first ground speed 100 of the first lateral edge 96 of the harvester head 24 and the second ground speed 102 of the second lateral edge 98 of the harvester head 24. The manner in which the controller 76 may determine the first ground speed 100 and the second ground speed 102 may vary depending upon the specific type of data sensed. Furthermore, it should be appreciated that multiple processes exist for calculating or otherwise determining the first ground speed 100 and the second ground speed 102, and that the controller 76 may implement any number of the different processes to calculate the first ground speed 100 and the second ground speed 102.

For example, if the harvester head 24 is equipped with the first head speed sensor 122 and the second head speed sensor 124 for directly sensing the speed of the first lateral edge 96 and the second lateral edge 98 of the harvester head 24 relative to the ground respectively, then the controller 76 may use this data as a direct indication of the first ground speed 100 and the second ground speed 102 respectively. Alternatively, if the first head speed sensor 122 and the second head speed sensor 124 are configured for sensing a distance moved, then the controller 76 may use this data with time data to calculate the first ground speed 100 and the second ground speed 102 respectively.

In other embodiments, the controller 76 may use other data to indirectly determine or calculate the first ground speed 100 and the second ground speed 102. For example, the controller 76 may determine or otherwise calculate a steering angle 74 of the traction unit 22, and using known dimensions of the traction unit 22 and the harvester head 24, the controller 76 may calculate the primary radius 110 of curvature of the travel path 104 of the traction unit 22 and an angular velocity of the traction unit 22 on the travel path 104. Using the primary radius 110 of curvature of the travel path 104 and the angular velocity of the traction unit 22, along with the known dimensions of the traction unit 22 and the harvester head 24, the controller 76 may calculate the first ground speed 100 and the second ground speed 102.

In order to calculate the steering angle 74 of the traction unit 22, the controller 76 may use data from the steering sensor 72 as a direct indication of the steering angle 74 of the traction unit 22. In other implementations, the controller 76 may use the rotational speed data from the first wheel speed sensor 80 and the second wheel speed sensor 82, along with known dimensions and operating properties of the traction unit 22 to determine or otherwise calculate the steering angle 74. In other implementations, the controller 76 may use the data from the first steerable wheel angle sensor 84 and the second steerable wheel angle sensor 86 to determine or otherwise calculate the steering angle 74 of the traction unit 22.

It should be appreciated that the controller 76 may use other processes to calculate the steering angle 74, and that the controller 76 may use multiple different processes in combination to calculate the steering angle 74. Furthermore, the mathematical operations used for calculating the steering angle 74 are dependent upon the specific data used. These mathematical operations and equations are known to those skilled in the art and are therefore not described in detail herein. Additionally, the mathematical operations and equations used for calculating the primary radius 110 of curvature of the travel path 104 and the angular velocity of the traction unit 22 from the steering angle 74 and the ground speed of the traction unit 22, as well as calculating the first ground speed 100 and the second ground speed 102 from the primary radius 110 of curvature and the angular velocity are known to those skilled in the art, and are therefore not described in detail herein.

Once the controller 76 has determined the first ground speed 100 and the second ground speed 102, the controller 76 may then compare each of the first ground speed 100 and the second ground speed 102 to the maximum allowable harvest speed. The controller 76 compares the first ground speed 100 and the second ground speed 102 to the maximum allowable harvest speed to determine if either the first ground speed 100 or the second ground speed 102 is greater than the maximum allowable harvest speed, or if both the first ground speed 100 and the second ground speed 102 are equal to or less than the maximum allowable harvest speed.

If the controller 76 determines that both of the first ground speed 100 and the second ground speed 102 of the harvester head 24 are equal to or less than the maximum allowable harvest speed, then the controller 76 may continue to control the drive system 38 of the traction unit 22 to move the traction unit 22 at the initial traction unit 22 ground speed when.

If the controller 76 determines that one of the first ground speed 100 or the second ground speed 102 of the harvester head 24 is greater than the maximum allowable harvest speed, then the controller 76 may calculate a reduced traction unit 22 ground speed. The controller 76 may calculate the reduced traction unit 22 ground speed in any suitable manner. For example, the controller 76 may reduce the initial traction unit 22 ground speed by a pre-defined increment to define or calculate the reduced traction unit 22 ground speed, re-determine the first ground speed 100 and the second ground speed 102 respectively, and then determine if the reduced traction unit 22 ground speed was reduced sufficiently to limit both the first ground speed 100 and the second ground speed 102 to values that are equal to or less than the maximum allowable harvest speed. If the reduced traction unit 22 ground speed did limit both the first ground speed 100 and the second ground speed 102 to values equal to or less than the maximum allowable ground speed, then the controller 76 may maintain control of the traction unit 22 at the reduced traction unit 22 ground speed until the steering angle 74 is changed. If the reduced traction unit 22 ground speed did not limit both the first ground speed 100 and the second ground speed 102 to value equal to or less than the maximum allowable ground speed, then the controller 76 may further reduce the initial traction unit 22 ground speed by the pre-defined increment to re-define or re-calculate the reduced traction unit 22 ground speed, and repeat the above described process.

In another implementation, the controller 76 may calculate the reduced traction unit 22 ground speed to equal a speed that limits both the first ground speed 100 and the second ground speed 102 of the harvester head 24 to respective values that are equal to or less than the maximum allowable harvest speed. The controller 76 may calculate the reduced traction unit 22 ground speed using the steering angle 74 of the traction unit 22 and the known dimensions of the traction unit 22 and harvester head 24. Once the reduced traction unit 22 ground speed is calculated, the controller 76 may control the drive system 38 to move the traction unit 22 at the reduced traction unit 22 ground speed until the steering angle 74 is changed.

The controller 76 may track the steering angle 74 of the traction unit 22, and continuously change the reduced traction unit 22 ground speed based on changes in the first ground speed 100 and/or the second ground speed 102 respectively. Additionally, it should be appreciated that the controller 76 may control the traction unit 22 to move at the initial traction unit 22 ground speed once the traction unit 22 is moving in a generally straight line, in which the first ground speed 100 and the second ground speed 102 are substantially equal to the ground speed 106 of the traction unit 22.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A harvester implement comprising:
   a traction unit extending along a central longitudinal axis between a forward end and a rearward end relative to a direction of forward travel, the traction unit including a drive system operable to move the traction unit;
   a harvester head attached to the traction unit and spanning a head width perpendicular to the central longitudinal axis between a first lateral edge and a second lateral edge;
   a controller having a processor and a memory having a speed control algorithm stored thereon, wherein the processor is operable to execute the speed control algorithm to:
      receive, via a user input, a maximum allowable harvest speed;
      determine a first ground speed of the first lateral edge of the harvester head;
      determine a second ground speed of the second lateral edge of the harvester head;
      determine if either the first ground speed or the second ground speed is greater than the maximum allowable harvest speed; and
      control the drive system to decrease a ground speed from an initial traction unit ground speed to a reduced traction unit ground speed when one of the first ground speed or the second ground speed of the harvester head is greater than the maximum allowable harvest speed.

2. The harvester implement set forth in claim 1, wherein the processor is operable to execute the speed control algorithm to calculate the reduced traction unit ground speed to equal a speed that limits both the first ground speed and the second ground speed of the harvester head to respective values that are equal to or less than the maximum allowable harvest speed.

3. The harvester implement set forth in claim 1, further comprising at least one sensor in communication with the controller and operable to sense data related to the first ground speed and the second ground speed of the harvester implement.

4. The harvester implement set forth in claim 3, wherein the at least one sensor includes a first head speed sensor positioned proximate the first lateral edge of the harvester head and operable to sense data related to the first ground speed of the harvester head, and a second head speed sensor positioned proximate the second lateral edge of the harvester head and operable to sense data related to the second ground speed of the harvester head.

5. The harvester implement set forth in claim 3, wherein the at least one sensor is operable to sense data related to a steering angle of the traction unit.

6. The harvester implement set forth in claim 5, wherein the processor is operable to execute the speed control algorithm to calculate a steering angle of the traction unit from the data sensed from the at least one sensor related to the steering angle of the traction unit.

7. The harvester implement set forth in claim 6, wherein the at least one sensor includes a steering angle sensor coupled to a steering input.

8. The harvester implement set forth in claim 6, wherein the drive system includes a first drive wheel and a second drive wheel disposed opposite the central longitudinal axis from the first drive wheel, and wherein the at least one sensor includes a first wheel speed sensor operable to sense data related to a rotational speed of the first drive wheel, and a second wheel speed sensor operable to sense data related to a rotational speed of the second drive wheel.

9. The harvester implement set forth in claim 8, wherein the processor is operable to execute the speed control algorithm to calculate a steering angle of the traction unit from the data sensed from the first wheel speed sensor related to the rotational speed of the first drive wheel and the second wheel speed sensor related to the rotational speed of the second drive wheel.

10. The harvester implement set forth in claim 6, wherein the traction unit includes a first steerable wheel and a second steerable wheel disposed opposite the central longitudinal axis from the first steerable wheel, and wherein the at least one sensor includes a first steerable wheel angle sensor operable to sense data related to an angle of the first steerable wheel relative to the central longitudinal axis, and a second steerable wheel angle sensor operable to sense data related to an angle of the second steerable wheel relative to the central longitudinal axis.

11. The harvester implement set forth in claim 10, wherein the processor is operable to execute the speed control algorithm to calculate a steering angle of the traction unit from the data sensed from the first steerable wheel angle sensor related to the angle of the first steerable wheel relative to the central longitudinal axis, and the second steerable wheel angle sensor related to the angle of the second steerable wheel relative to the central longitudinal axis.

12. The harvester implement set forth in claim 1, wherein processor is operable to execute the speed control algorithm to calculate a radius of curvature of a travel path of the traction unit and an angular velocity of the traction unit on the travel path.

13. The harvester implement set forth in claim 10, wherein the processor is operable to execute the speed control algorithm to calculate the first ground speed and the second ground speed of the harvester head from the radius of curvature of the travel path of the traction unit and the angular velocity of the traction unit on the travel path.

14. A method of controlling a harvester implement having a traction unit and a harvester head attached to the traction unit and extending perpendicular to a direction of travel of the traction unit, the method comprising:
   defining a maximum allowable harvest speed;
   controlling a drive system of the traction unit to move the traction unit at an initial traction unit ground speed;
   determining a first ground speed of a first lateral edge of the harvester head with a controller;
   determining a second ground speed of a second lateral edge of the harvester head with the controller;
   determining if either the first ground speed or the second ground speed is greater than the maximum allowable harvest speed with the controller;
   continuing to control the drive system of the traction unit with the controller to move the traction unit at the initial traction unit ground speed when both of the first ground speed and the second ground speed of the harvester head are equal to or less than the maximum allowable harvest speed; and
   controlling the drive system of the traction unit with the controller to decrease the initial traction unit ground speed to a reduced traction unit ground speed when one of the first ground speed or the second ground speed of the harvester head is greater than the maximum allowable harvest speed.

15. The method set forth in claim 14, further comprising calculating the reduced traction unit ground speed to equal a speed of the traction unit that limits both the first ground speed and the second ground speed of the harvester head to respective values that are equal to or less than the maximum allowable harvest speed.

16. The method set forth in claim 14, further comprising sensing data related to the first ground speed and the second ground speed of the harvester implement with at least one sensor in communication with the controller.

17. The method set forth in claim 14, further comprising calculating a radius of curvature of a travel path of the traction unit with the controller.

18. The method set forth in claim 17, further comprising calculating an angular velocity of the traction unit on the travel path with the controller.

19. The method set forth in claim 18, further comprising calculating the first ground speed and the second ground speed of the harvester head from the radius of curvature of the travel path of the traction unit and the angular velocity of the traction unit on the travel path.

\* \* \* \* \*